(12) United States Patent
Dimig et al.

(10) Patent No.: US 8,424,348 B2
(45) Date of Patent: Apr. 23, 2013

(54) STEERING LOCK

(75) Inventors: Steven J. Dimig, Plymouth, WI (US);
Jon W. Behrens, Brookfield, WI (US);
Michael D. Fink, Milwaukee, WI (US)

(73) Assignee: Strattec Security Corporation, Milwaukee, WI (US)

( * ) Notice: Subject to any disclaimer, the term of this patent is extended or adjusted under 35 U.S.C. 154(b) by 421 days.

(21) Appl. No.: 12/694,584

(22) Filed: Jan. 27, 2010

(65) Prior Publication Data

US 2011/0179836 A1 Jul. 28, 2011

(51) Int. Cl.
*B60R 25/02* (2006.01)

(52) U.S. Cl.
USPC .................................. 70/186; 70/182; 70/252

(58) Field of Classification Search ............ 70/182–186, 70/252
See application file for complete search history.

(56) References Cited

U.S. PATENT DOCUMENTS

| | | | |
|---|---|---|---|
| 3,638,462 A | 2/1972 | White et al. | |
| 4,232,537 A * | 11/1980 | Plaiss | 70/233 |
| 4,576,024 A | 3/1986 | Weber | |
| 4,638,882 A | 1/1987 | Sato | |
| 4,643,009 A | 2/1987 | Sato | |
| 4,776,189 A | 10/1988 | Weber et al. | |
| 5,133,106 A | 7/1992 | Milbredt et al. | |
| 5,896,765 A | 4/1999 | Peyre et al. | |
| 6,125,671 A | 10/2000 | Suzuki | |
| 6,233,986 B1 | 5/2001 | Suzuki et al. | |
| 6,295,848 B1 | 10/2001 | Suzuki | |
| 6,298,938 B1 | 10/2001 | Klaiber et al. | |
| 6,354,118 B1 | 3/2002 | Frick et al. | |
| 6,400,041 B1 | 6/2002 | Engelmann et al. | |
| 6,439,011 B1 | 8/2002 | Frick et al. | |
| 6,543,262 B2 | 4/2003 | Limburg et al. | |
| 6,571,587 B2 | 6/2003 | Dimig et al. | |
| 6,647,751 B2 | 11/2003 | Zillmann | |

(Continued)

FOREIGN PATENT DOCUMENTS

| | | |
|---|---|---|
| DE | 10017032 A1 | 4/2000 |
| DE | 102005030783 A1 | 3/2006 |

(Continued)

OTHER PUBLICATIONS

International Search Report and Written Opinion for corresponding International Application No. PCT/US2011/022586 mailed on Apr. 21, 2011.

*Primary Examiner* — Suzanne Barrett
(74) *Attorney, Agent, or Firm* — Michael Best & Friedrich LLP

(57) ABSTRACT

An actuation device for a steering lock is operable to selectively lock a rotary steering member against rotation. A lockbolt is movable along a first axis between a steering member-locking position and a steering member-unlocking position. A shuttle is movable between a non-blocking position in which the shuttle does not obstruct movement of the lockbolt from the steering member-locking position to the steering member-unlocking position and a blocking position in which the shuttle obstructs movement of the lockbolt from the steering member-locking position to the steering member-unlocking position. An actuator is coupled to the shuttle and operable to move the shuttle from at least one of the non-blocking position and the blocking position to the other of the non-blocking position and the blocking position. The actuator has an output defining a second axis that is substantially perpendicular to the first axis.

22 Claims, 12 Drawing Sheets

U.S. PATENT DOCUMENTS

| | | | |
|---|---|---|---|
| 6,718,805 B2 | 4/2004 | Okuno | |
| 6,755,058 B2 | 6/2004 | Zillmann | |
| 6,776,251 B2 | 8/2004 | Landmann | |
| 6,810,702 B2 | 11/2004 | Fuchs et al. | |
| 6,810,763 B1 | 11/2004 | Frick et al. | |
| 6,862,907 B2 | 3/2005 | Hayashi et al. | |
| 6,915,671 B2 | 7/2005 | Zillmann | |
| 6,941,781 B2 | 9/2005 | Fukushima | |
| 6,952,059 B1 | 10/2005 | Louvel et al. | |
| 7,007,525 B2 | 3/2006 | Okuno et al. | |
| 7,021,093 B2 | 4/2006 | Fukatsu et al. | |
| 7,055,351 B2 | 6/2006 | Suzuki et al. | |
| 7,086,256 B2 | 8/2006 | Hasegawa | |
| 7,098,554 B2 | 8/2006 | Hayashi et al. | |
| 7,104,097 B2 | 9/2006 | Zillmann | |
| 7,121,126 B2 | 10/2006 | Zillmann | |
| 7,140,213 B2 | 11/2006 | Feucht et al. | |
| 7,161,262 B2 | 1/2007 | Nagae et al. | |
| 7,187,089 B2 | 3/2007 | Fukano et al. | |
| 7,204,516 B2 | 4/2007 | Schneider et al. | |
| 7,234,328 B2 | 6/2007 | Okuno et al. | |
| 7,251,968 B2 | 8/2007 | Hasegawa | |
| 7,260,963 B2 | 8/2007 | Suzuki et al. | |
| 7,310,979 B2 | 12/2007 | Hasegawa | |
| 7,328,596 B2 | 2/2008 | Hasegawa et al. | |
| 7,362,006 B2 | 4/2008 | Otani et al. | |
| 7,363,785 B2 | 4/2008 | Limburg et al. | |
| 7,596,976 B2 | 10/2009 | Sugimoto | |
| 7,604,254 B2 | 10/2009 | Pieronczyk et al. | |
| 7,703,309 B2 * | 4/2010 | Okuno et al. | 70/186 |
| 7,714,459 B2 * | 5/2010 | Hirche et al. | 307/10.2 |
| 7,762,110 B2 * | 7/2010 | Tsukazaki | 70/186 |
| 7,810,363 B2 * | 10/2010 | Okada et al. | 70/186 |
| 7,823,426 B2 * | 11/2010 | Okuno et al. | 70/186 |
| 7,870,768 B2 * | 1/2011 | Tanioka et al. | 70/186 |
| 7,921,684 B2 * | 4/2011 | Okuno et al. | 70/186 |
| 8,006,526 B2 * | 8/2011 | Fort et al. | 70/186 |
| 8,047,028 B2 * | 11/2011 | Farmer et al. | 70/186 |
| 8,240,176 B2 * | 8/2012 | Okada | 70/182 |
| 8,256,252 B2 * | 9/2012 | Okada | 70/182 |
| 2005/0183476 A1 | 8/2005 | Feucht et al. | |
| 2006/0005588 A1 | 1/2006 | Okuno | |
| 2006/0021399 A1 * | 2/2006 | Hasegawa | 70/186 |
| 2006/0169010 A1 | 8/2006 | Limburg | |
| 2006/0169011 A1 | 8/2006 | Limburg | |
| 2008/0047309 A1 | 2/2008 | Okuno et al. | |
| 2008/0202275 A1 | 8/2008 | Rouleau et al. | |
| 2009/0007612 A1 | 1/2009 | Laval et al. | |
| 2009/0064739 A1 | 3/2009 | Trischberger et al. | |
| 2009/0084145 A1 | 4/2009 | Sugimoto | |
| 2009/0165510 A1 | 7/2009 | Sugimoto | |
| 2009/0266195 A1 | 10/2009 | Tanke et al. | |
| 2010/0018265 A1 | 1/2010 | Kumano | |
| 2010/0212377 A1 * | 8/2010 | Graglia | 70/183 |
| 2011/0132048 A1 * | 6/2011 | Okada | 70/182 |
| 2011/0167885 A1 * | 7/2011 | Sugimoto | 70/186 |

FOREIGN PATENT DOCUMENTS

| | | |
|---|---|---|
| DE | 102005050920 A1 | 5/2007 |
| DE | 102006059282 A1 | 6/2008 |
| EP | 1174314 A2 | 1/2002 |
| EP | 1477378 B1 | 9/2005 |
| EP | 1953049 A2 | 8/2008 |
| WO | 02090152 A2 | 11/2002 |
| WO | 2007127962 A2 | 11/2007 |

* cited by examiner

# STEERING LOCK

BACKGROUND

The present invention relates to locking mechanisms for locking (i.e., preventing unauthorized rotation of) a rotary steering member such as a steering wheel, handlebar, etc. of a vehicle.

Conventional steering column locks use an actuator mechanism to drive a locking pin into and out of locking engagement with a steering shaft. Efficient transfer of motion can be accomplished by directly driving the locking pin back and forth. However, certain circumstances may arise in which the locking pin becomes substantially wedged against one of the recesses in the steering shaft. In order to account for this occurrence, the electric motor that drives the locking pin and the corresponding electric drive circuit for the motor must have current/power ratings substantially higher than what is required for normal operation (when the locking pin is not wedged). Also, complex gear reduction devices may be implemented in order to multiply the torque output of the motor. In either case, the locking device as a whole becomes more costly and complicated, and may generate excessive noise.

SUMMARY

In one construction, the invention provides an actuation device for a steering lock which is operable to selectively lock a rotary steering member against rotation. A lockbolt is movable along a first axis between a steering member-locking position and a steering member-unlocking position. A shuttle is movable between a non-blocking position, in which the shuttle does not obstruct movement of the lockbolt from the steering member-locking position to the steering member-unlocking position, and a blocking position, in which the shuttle obstructs movement of the lockbolt from the steering member-locking position to the steering member-unlocking position. An actuator is coupled to the shuttle and operable to move the shuttle from at least one of the non-blocking position and the blocking position to the other of the non-blocking position and the blocking position. The actuator has an output defining a second axis that is substantially perpendicular to the first axis.

In another construction, the invention provides an actuation device for a steering lock which is operable to selectively lock a rotary steering member against rotation. A lockbolt is movable along a first axis between a steering member-locking position and a steering member-unlocking position. A shuttle is movable between a non-blocking position, in which the shuttle does not obstruct movement of the lockbolt from the steering member-locking position to the steering member-unlocking position, and a blocking position, in which the shuttle obstructs movement of the lockbolt from the steering member-locking position to the steering member-unlocking position. The shuttle is movable between the non-blocking position and the blocking position in a plane of movement substantially perpendicular to the first axis. An actuator is coupled to the shuttle and operable to move the shuttle from at least one of the non-blocking position and the blocking position to the other of the non-blocking position and the blocking position.

In yet another construction, the invention provides an actuation device for a steering lock which is operable to selectively lock a rotary steering member against rotation. A lockbolt is movable along a first axis between a steering member-locking position and a steering member-unlocking position. A shuttle is actuable from a non-blocking position, in which the shuttle does not obstruct movement of the lockbolt from the steering member-locking position to the steering member-unlocking position, to a blocking position, in which the shuttle obstructs movement of the lockbolt from the steering member-locking position to the steering member-unlocking position. An actuator is coupled to the shuttle and operable to move the shuttle from the non-blocking position to the blocking position to actuate the lockbolt toward the steering member-locking position. The actuator and the shuttle are only operable to generate a force on the lockbolt that urges the lockbolt toward the steering member-locking position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
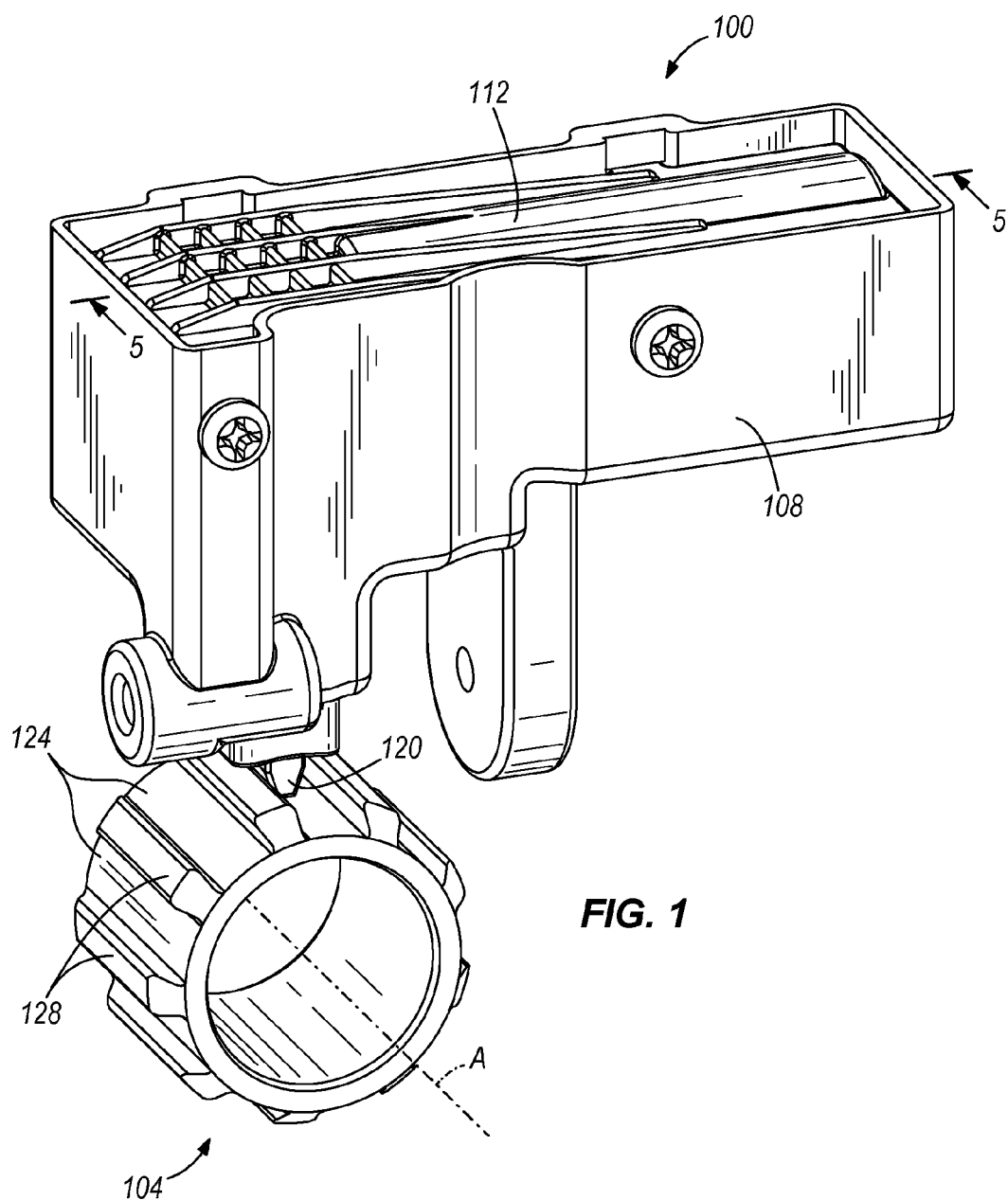
FIG. 1 is a perspective view of a steering lock in a locked state.
Figure 2:
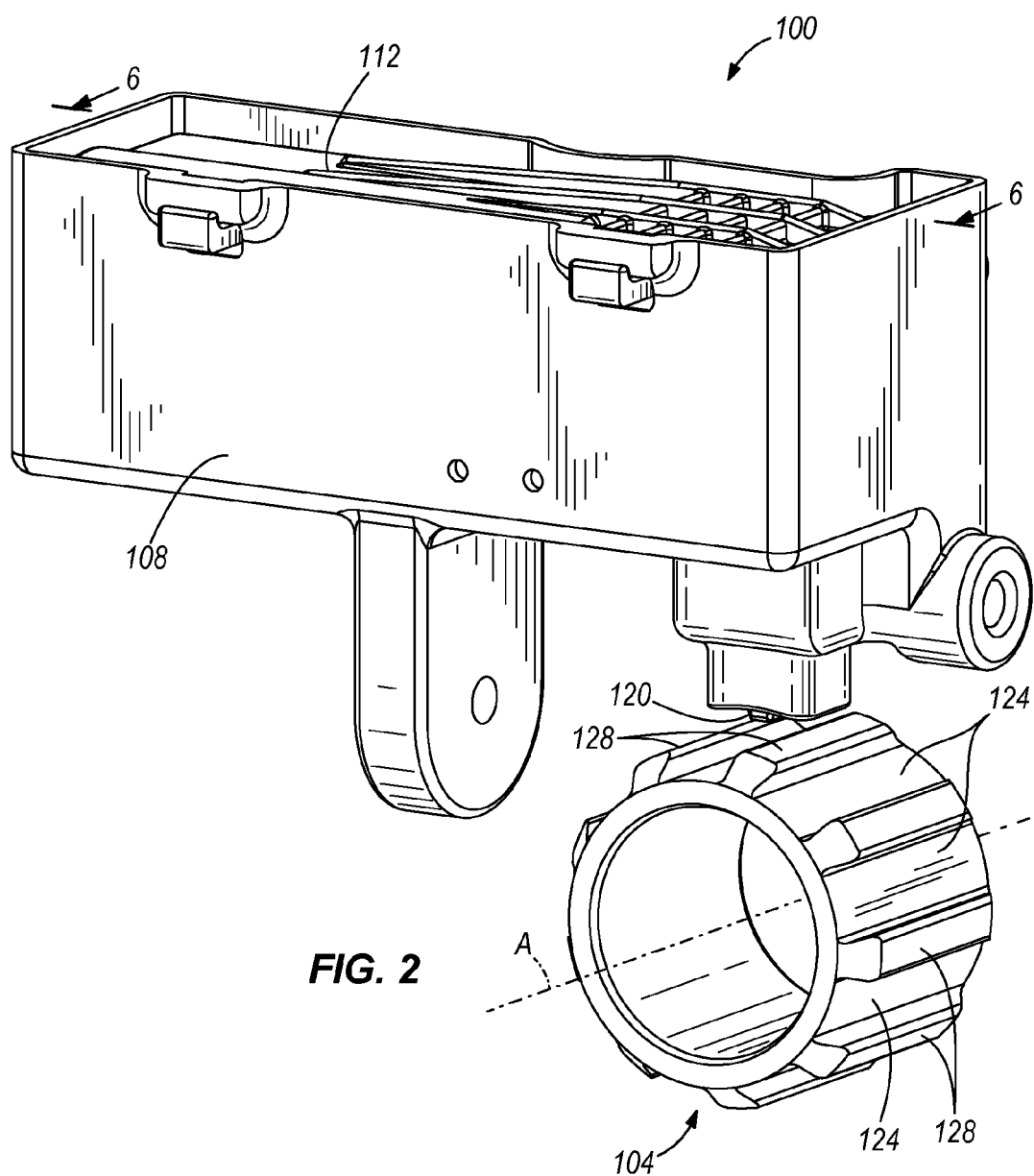
FIG. 2 is a perspective view of the steering lock of FIG. 1 in an unlocked state.

FIGS. 1 and 2 illustrate a steering lock 100 operable to selectively lock an adjacent steering member 104 against rotation about its axis A. The steering lock 100 includes a housing 108 that is mounted at a predetermined location proximate the steering member 104. A cover 112 is removably coupled to the housing 108 to enclose an actuation device 116 of the steering lock 100. The actuation device 116, illustrated in FIGS. 3 and 4 and discussed in further detail below, includes a lockbolt 120 that is movable between a steering member-locking position or simply "locked" position (FIG. 1) and a steering member-unlocking position or simply "unlocked" position (FIG. 2). In the illustrated construction, the lockbolt 120 is movable between the locked and unlocked positions along an axis B that is substantially perpendicular to the axis A of the steering member 104.

As shown in at least FIGS. 1 and 2, the ring-shaped steering member 104 includes a plurality of notches or grooves 124 that are elongated parallel to the axis A. Each adjacent pair of grooves 124 are separated by a rib 128. When the steering lock 100 is locked, the lockbolt 120 is positioned within one of the grooves 124, and interference between the lockbolt 120 and the two adjacent ribs 128 prevent substantial rotation of the steering member 104 about the axis A. The size, shape, and number of the grooves 124 and the ribs 128 can be varied from the illustrated construction according to the needs of a particular application. Although limited rotation of the steering member 104 may be possible in some circumstances when locked by the steering lock 100, the steering mechanism (e.g., steering wheel, handlebars, etc.) to which the steering member 104 is coupled is rendered unusable for normal operation of the vehicle on which the steering lock 100 is provided.

Figure 3:
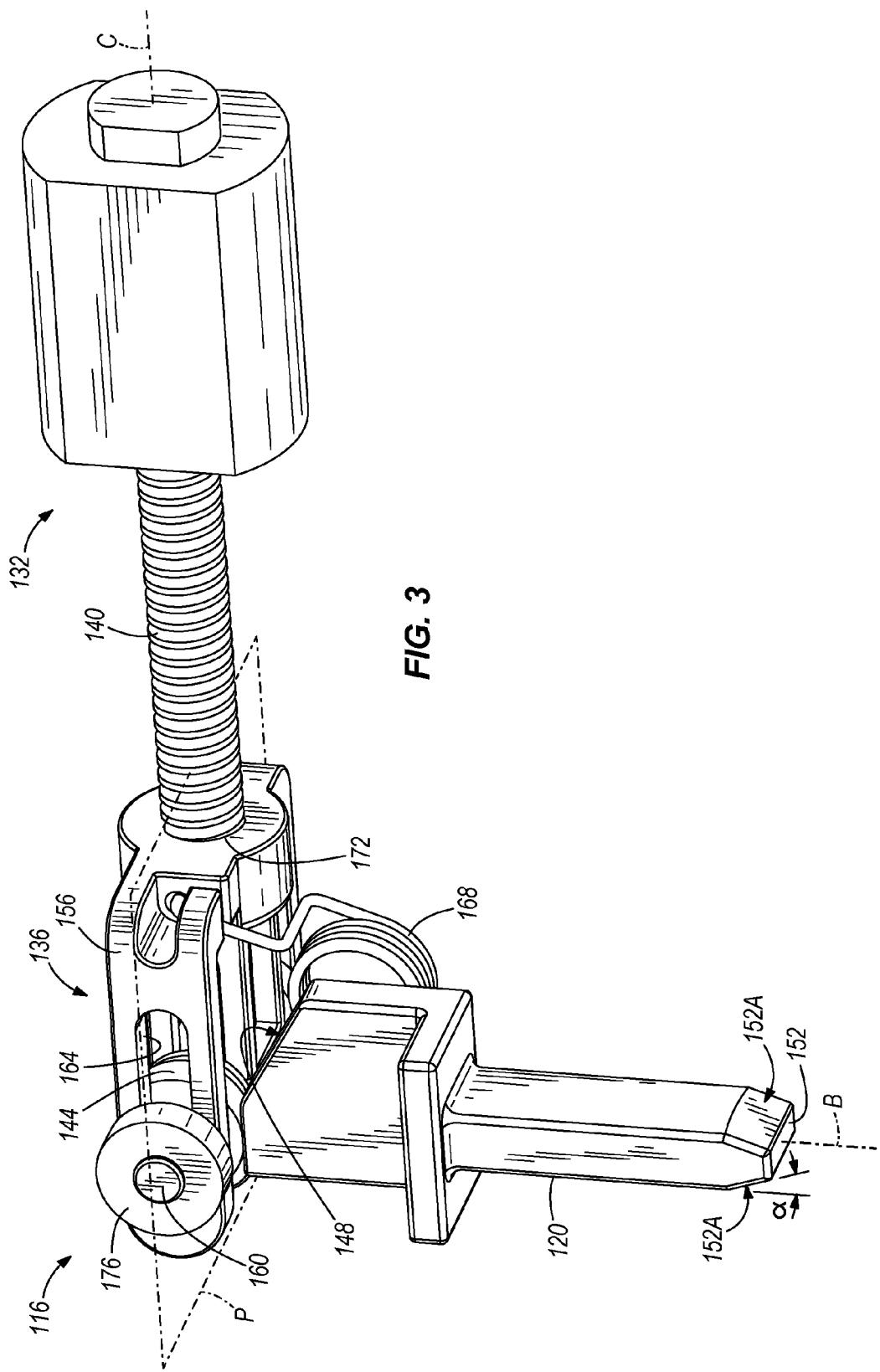
FIG. 3 is a perspective view of an actuation device of the steering lock of FIG. 1.
Figure 4:
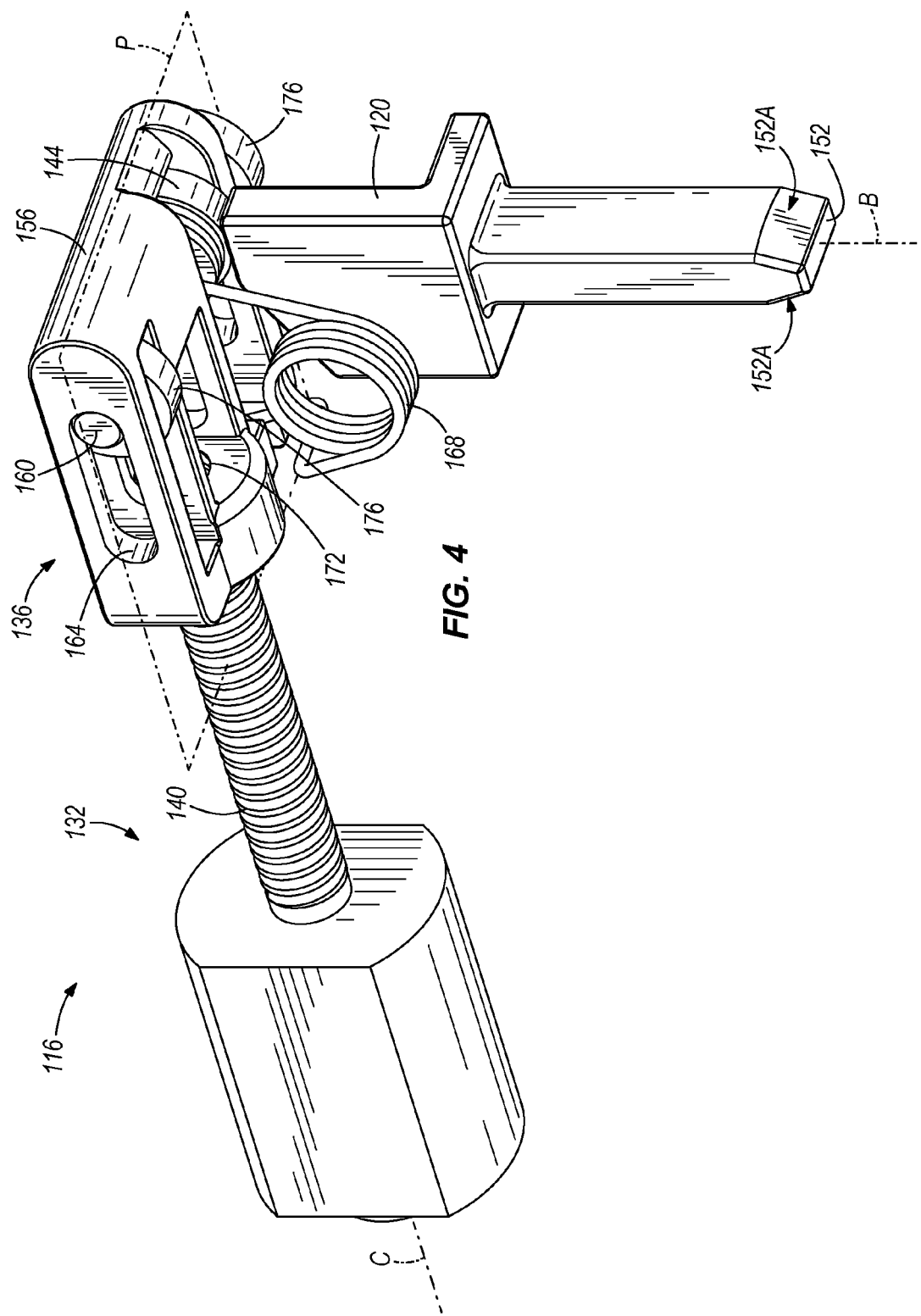
FIG. 4 is a second perspective view of the actuation device of FIG. 3.

As shown in FIGS. 3 and 4, the actuation device 116 includes an actuator 132 and a shuttle 136 in addition to the lockbolt 120. The actuator 132 of the illustrated construction is an electric motor, although other types of actuators may be used. As discussed in further detail below, in some constructions the actuator 132 is an electric motor rated for less than 1.0 A of current at max load. In some constructions, the actuator 132 is an electric motor rated for about 500 mA of current at max load. As shown in FIGS. 3 and 4, the actuator 132 includes an output shaft 140. In the illustrated construction, the output shaft 140 is a lead screw rotatable about an axis C defined by the actuator 132. The lead screw may have a pitch of about 10 teeth per inch.

Although the output shaft 140 is illustrated as extending directly from the actuator 132, the actuator 132 may be coupled to the output shaft 140 by a power transmission device such as a gear train having one or more gears that alter the torque and speed of the output shaft 140. In such constructions, the output shaft 140 may have an axis that is different from the axis of the actuator 132, and may be linearly offset or angled relative thereto. Such an arrangement may not only provide a desired gear ratio but also a desired orientation of components (e.g., for more efficient packaging, etc.). For example, FIG. 8 illustrates a steering lock 200 including an output shaft 240 that is offset from the actuator 232. Except as described herein, the steering lock 200 is otherwise substantially identical to the steering lock 100 of FIGS. 1-7. As such, similar reference characters (with leading digits increased by 100) are used for similar parts where appropriate. Reference is made to the above description of the steering lock 100 for features and aspects of the steering lock 200 of FIG. 8 not specifically described below.

In the steering lock 200 of FIG. 8, the output shaft 240 is offset from the axis C2 of the actuator 232. In the illustrated construction, the output shaft 240 is parallel to the axis C2 of the actuator 232 and is coupled to the actuator 232 by a power transmission device (e.g., gear train). Although other offset arrangements are optional, the actuator 232 includes a shaft 239 provided with a drive gear 241. The output shaft 240 is provided with a driven gear 243 that is rotated by the drive gear 241. The available torque at the output shaft 240 is increased and its angular velocity is decreased by driving it through the two gears 241, 243 instead of being driven directly by the shaft 239 of the actuator 232. Thus, the output shaft 240 (which is configured as a lead screw in the illustrated construction) may be provided with fewer threads per inch than the output shaft 140 of the steering lock 100 of FIGS. 1-7. For example, the output shaft 240 of FIG. 8 may be provided with only about 4 teeth per inch. The housing 208 is provided with a pair of internal cradles 249 for rotatably supporting the output shaft 240 on both sides of the driven gear 243.

Returning now to the construction illustrated in FIGS. 1-7, the shuttle 136 is engaged with the output shaft 140 to be moved between two positions by the actuator 132. The first position of the shuttle 136 is a blocking position (FIG. 3) in which the shuttle 136 obstructs movement of the lockbolt 120 from the locked position (FIG. 1) to the unlocked position (FIG. 2). The second position of the shuttle 136 is a non-blocking position in which the shuttle 136 does not obstruct movement of the lockbolt 120 from the locked position (FIG. 1) to the unlocked position (FIG. 2). As described in further detail below, the shuttle 136 is configured to move in a plane P that is substantially perpendicular to the lockbolt axis B.

In some constructions, as shown in FIGS. 3-7, the shuttle 136 includes a cam roller 144 and the lockbolt 120 includes a cam follower surface 148. In the illustrated construction, the cam follower surface 148 is opposite a tip or engagement end 152 of the lockbolt 120 which is engageable with the steering member 104. The cam follower surface 148 includes a first portion 148A that is inclined relative to both the lockbolt axis B and the plane P in which the shuttle moves and a second portion 148B that is substantially perpendicular to the lockbolt axis B and parallel to the shuttle's plane of movement P. Movement of the cam roller 144 along the cam follower surface 148 occurs with rolling contact which limits the amount of friction that the actuator 132 must overcome to move the shuttle 136.

The shuttle 136 further includes a guide body 156, which supports and guides the cam roller 144. In the illustrated construction, the cam roller 144 is mounted on a shaft 160 that extends through a slot 164 formed in the guide body 156. The slot 164 is elongated in a direction substantially perpendicular to the lockbolt axis B. A spring 168 of the shuttle 136 biases the shaft 160 and the cam roller 144 to an end of the slot 164 that is furthest away from the output shaft 140 of the actuator 132. In the illustrated construction, the spring 168 is a torsion spring that can function as a lost motion device as described in further detail below.

The guide body 156 of the shuttle 136 includes a threaded aperture 172 that is engaged with the output shaft 140 of the actuator 132 and coaxial with its axis C. In the illustrated construction, the output shaft 140, which is a lead screw, rotates about the axis C and drives motion of the shuttle along the axis C (within the shuttle's plane of movement P). In other constructions, the output shaft 140 of the actuator 132 may be configured to move in and out of the actuator 132 along the axis C such that the shuttle 136 may be fixed relative to the output shaft 140 and moved directly with the output shaft 140. In yet other constructions, the actuator 132 may be configured to rotate the shuttle 136 (within the plane P) between the blocking position and the non-blocking position. Furthermore, a separate nut (not shown) may be provided rather than providing the threaded aperture 172 directly in the guide body 156. This not only allows different materials to be used for the guide body 156 and the nut as desired, but also allows the establishment of a dynamic relationship between the nut and the guide body 156. For example, the nut can be made slidable within the guide body 156 so that, when the output shaft 140 rotates, the nut travels relative to the guide body 156 and achieves a running speed before contacting the guide body 156. This reduces the starting load on the actuator 132 and provides an impact-type actuation of the shuttle 136, and specifically the guide body 156.

As shown in FIGS. 3 and 4, the shuttle 136 includes auxiliary rollers 176 mounted on the shaft 160 of the cam roller 144. The auxiliary rollers 176 are guided by internal guide surfaces 178 of the housing 108 and the cover 112. The guide surfaces 178 are flat so that the contact between the auxiliary rollers 176 and the guide surfaces 178 keep the movement of the shuttle 136 within the desired plane P. The auxiliary rollers 176 provide a guiding function with rolling contact which limits the amount of friction that the actuator 132 must overcome to move the shuttle 136.

Figure 5:
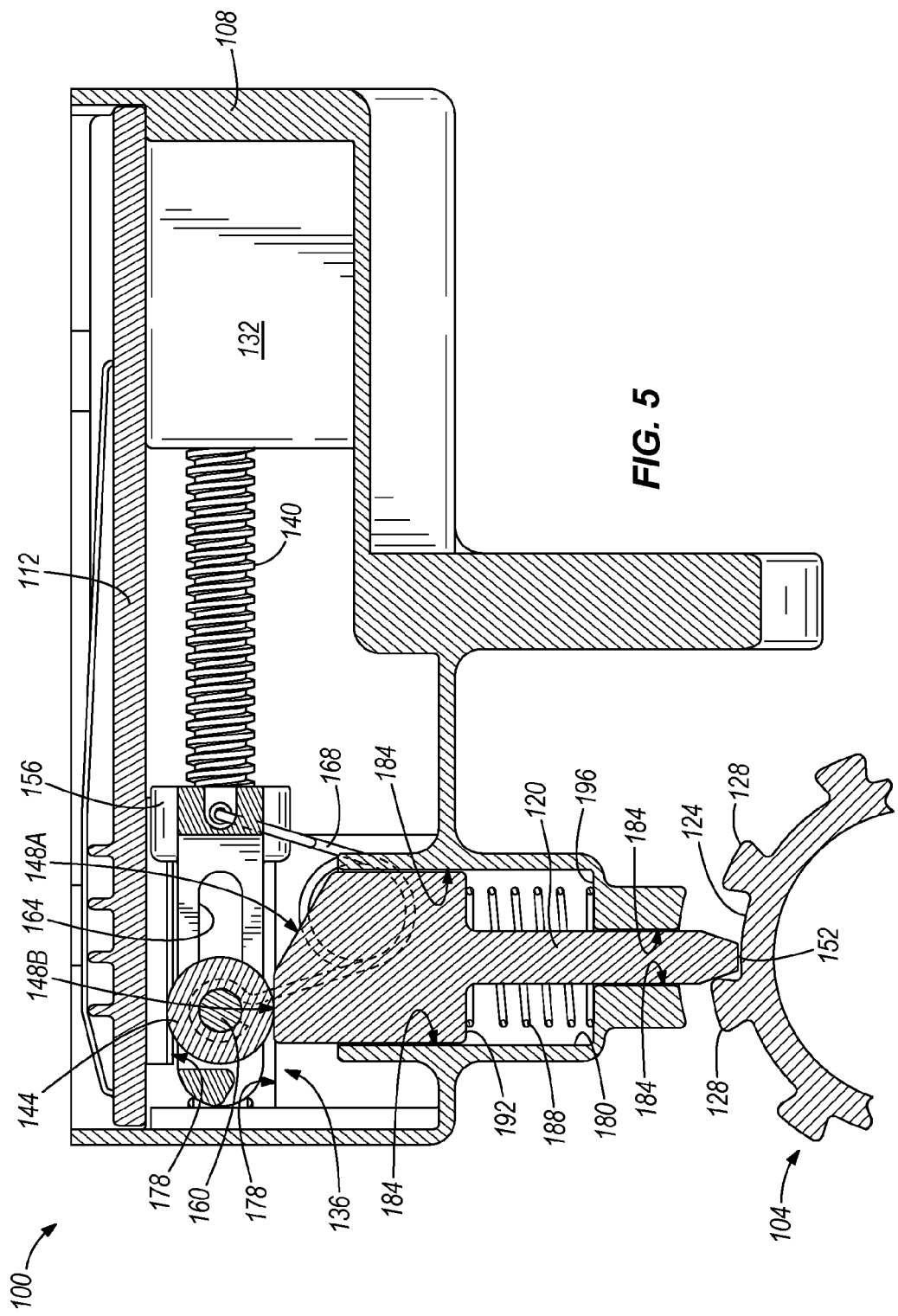
FIG. 5 is a cross-sectional view of the steering lock, taken along line 5-5 of FIG. 1.
Figure 6:
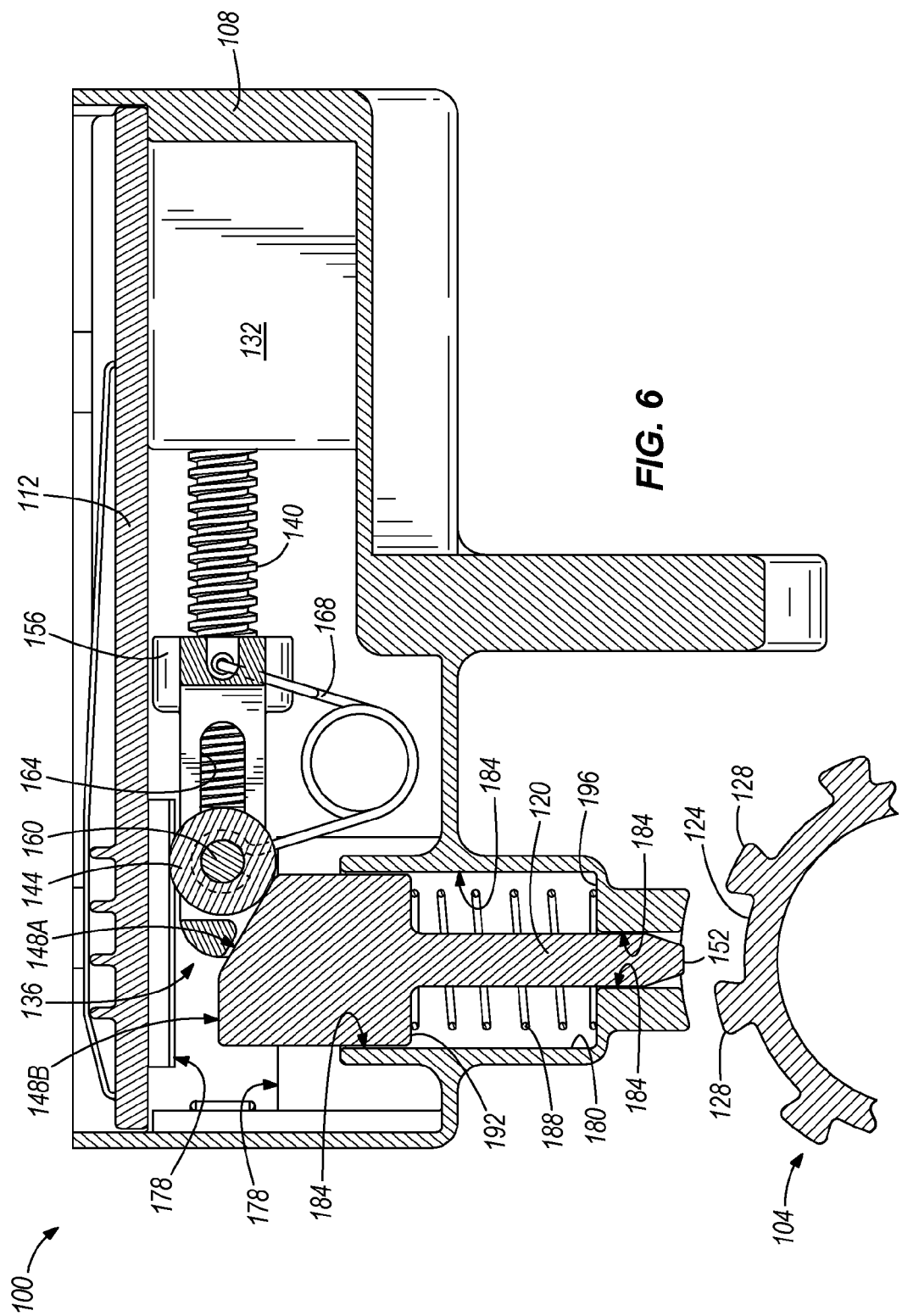
FIG. 6 is a cross-sectional view of the steering lock, taken along line 6-6 of FIG. 2.
Figure 7:
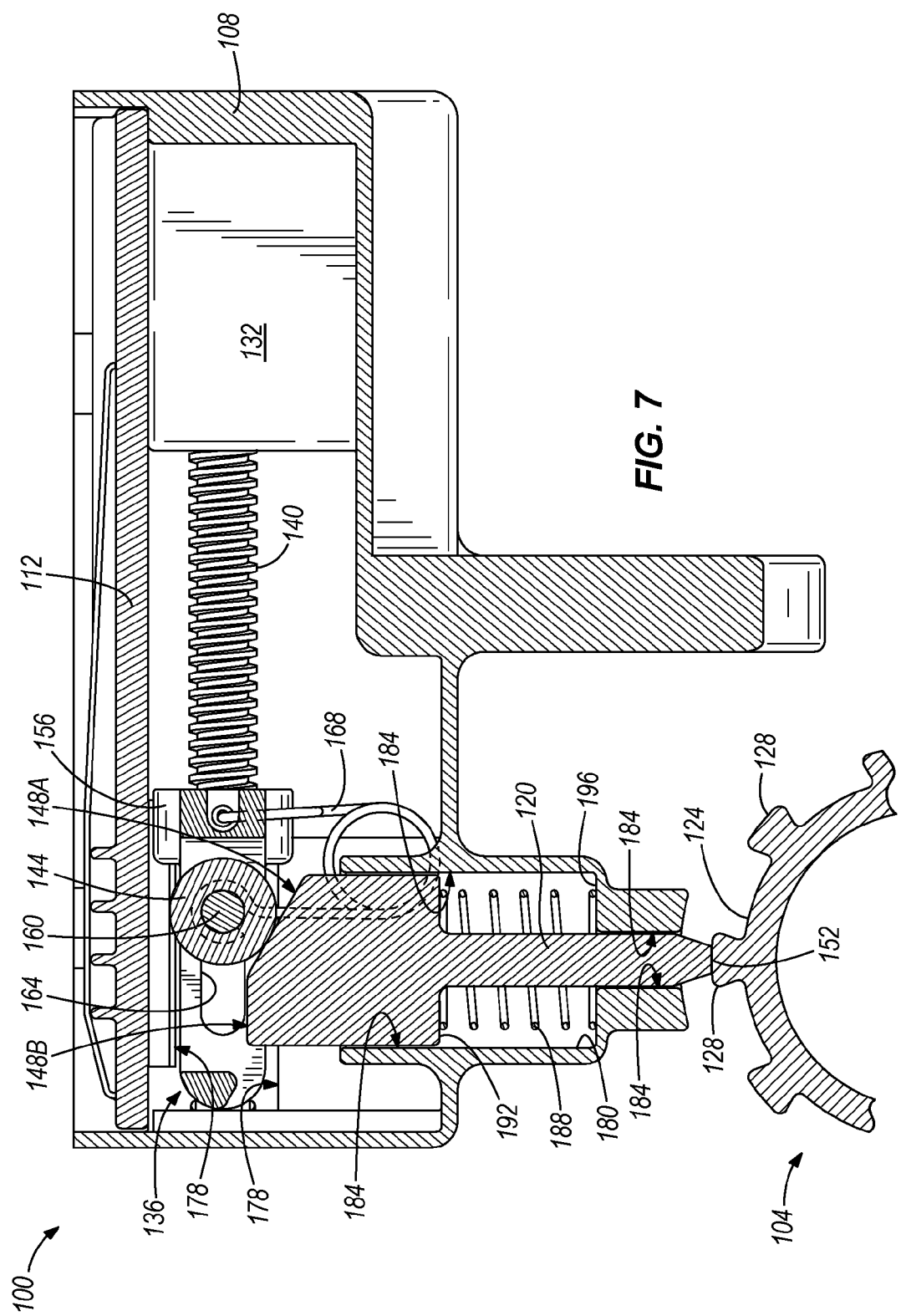
FIG. 7 is a cross-sectional view of the steering lock of FIG. 1 in a state in which a lockbolt is obstructed from reaching the locked state when actuated.
Figure 8:
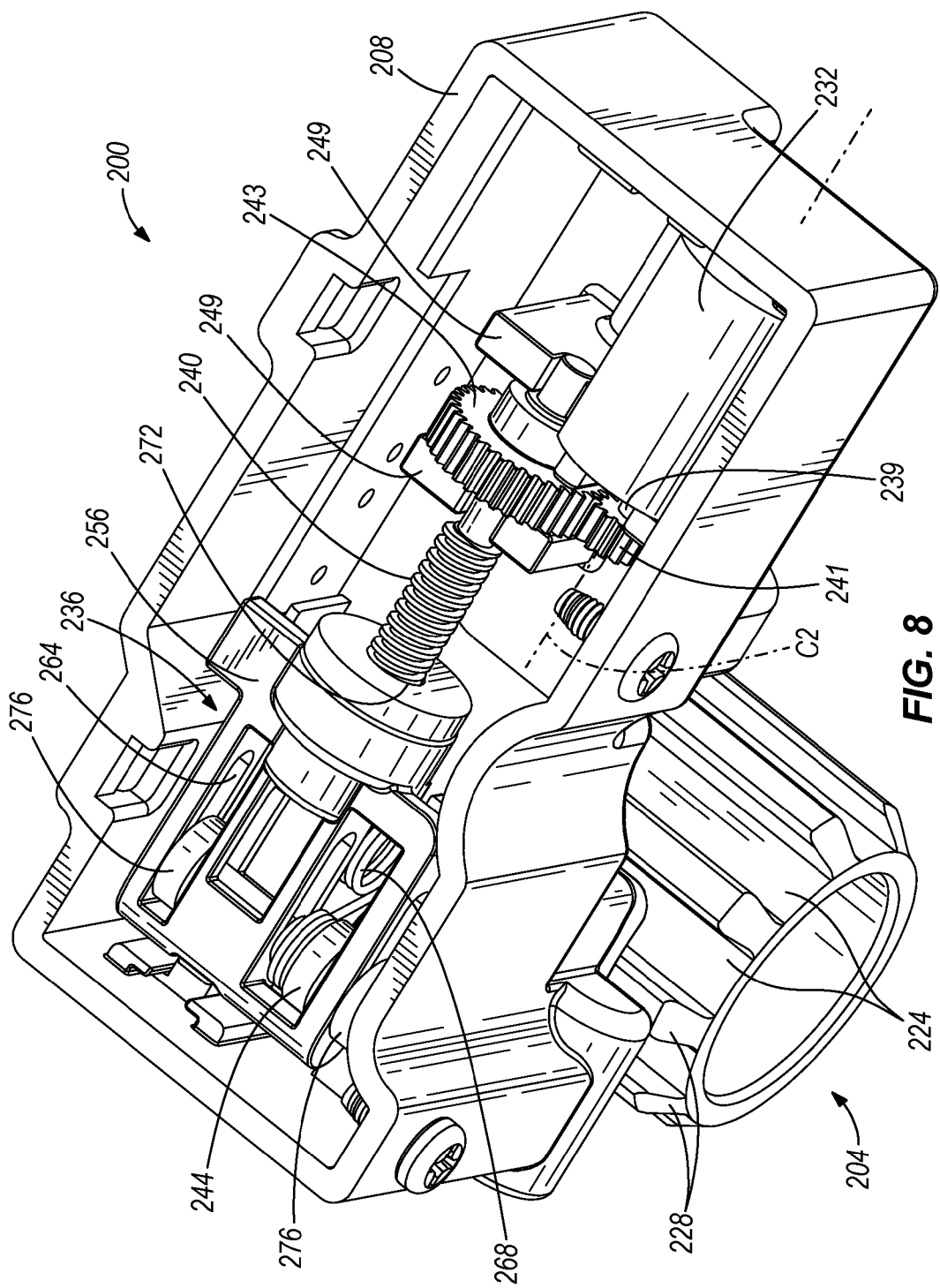
FIG. 8 is a perspective view of a steering lock according to another construction in which the output shaft is offset from the actuator axis.

As shown in FIGS. 5-7, the housing 108 includes an internal recess 180 in which the lockbolt 120 is positioned. The internal recess 180 is provided with a plurality of guide surfaces 184 that guide movement of the lockbolt 120 along the axis B. A spring 188 is positioned between respective abutment surfaces 192, 196 of the lockbolt 120 and the internal recess 180. The spring 188 biases the lockbolt 120 in a direction along the axis B that tends to retract the lockbolt 120 into the housing 108 and away from the steering member 104. In other words, the spring 188 biases the lockbolt 120 toward the unlocked position.

In operation, the steering lock 100 is kept in the unlocked state (FIGS. 2 and 6) during normal operation of the vehicle. In this manner, the steering member 104 can rotate freely about its axis A without obstruction from the lockbolt 120. Upon being commanded by the operator or automatically by a predetermined function of the vehicle's security system, the steering lock 100 can be moved to the locked state (FIGS. 1 and 5).

In order to move the steering lock 100 to the locked state, the actuator 132 is powered. Powering the actuator 132 may include supplying electrical current to an electric motor via an electrical circuit, but may alternately include supplying energy to the output shaft 140 by mechanical or fluid means. When the output shaft 140 is constructed as a lead screw, rotation of the output shaft 140 drives the guide body 156 to move parallel to the axis C of the actuator 132. The spring 168 between the guide body 156 and the cam roller 144 is strong enough to transfer the motion from the guide body 156 to the cam roller 144 so that the cam roller 144 rolls from the inclined first portion 148A of the cam follower surface 148 to the second portion 148B, thereby overcoming the bias of the lockbolt spring 188 and moving the lockbolt 120 to the locked position (FIG. 5).

The above description of how the actuation device 116 moves the lockbolt 120 to the locked position assumes that the lockbolt 120 is aligned with one of the notches 124 of the steering member 104 and not one of the intermediate ribs 128. However, there is a significant chance that, at the time that the actuator 132 is powered to move the steering lock 100 from the unlocked state to the locked state, the lockbolt 120 will be aligned with one of the ribs 128. This occurrence is illustrated in FIG. 7. In the event that the lockbolt 120 is aligned with one of the ribs 128 when actuated, the actuator 132 still actuates and moves the guide body 156 of the shuttle 136 just as it would if the lockbolt 120 were aligned with one of the notches 124. However, the movement of the lockbolt 120 is stopped prematurely when the tip 152 contacts the top of the rib 128. As the actuator 132 continues to move the guide body 156, the spring 168 acts as a lost motion device, storing energy while the cam roller 144 remains in contact with the inclined cam follower surface portion 148A. The slot 164 in the guide body 156 allows the guide body 156 to move relative to the shaft 160 and the cam roller 144. The lost motion device prevents an overloading of the actuator 132 when the lockbolt 120 contacts the top of a rib 128 and allows the lockbolt 120 to later move to the locked position without further powering the actuator 132. As soon as the steering member 104 is moved slightly to remove the obstructing rib 128 from the path of the lockbolt 120, the energy stored in the spring 168 is released, driving the cam roller 144 to the second portion of the cam follower surface 148B and simultaneously moving the lockbolt 120 into the locked position.

In some instances, one of the ribs 128 of the steering member 104 may become wedged against the lockbolt 120 when the lockbolt 120 is in the locked position. For example, this may occur when one or more of the steerable wheels coupled to the steering member 104 are wedged against a stationary object, such as a curb. When a wedged condition exists and it is desired to move the steering lock 100 from the locked state to the unlocked state (thereby withdrawing the lockbolt 120 from the steering member 104), the actuator 132 operates normally and one or more passive features assist in releasing the lockbolt 120 from the wedged condition. The steering lock 100 does not rely on the power supplied by the actuator 132 to extract or "un-wedge" the lockbolt 120. In fact, the actuator 132 and the shuttle 136 provide "push-only" actuation of the lockbolt 120, and in some constructions, are not coupled in a manner that enables urging of the lockbolt 120 toward the unlocked position by the power of the actuator 132. Because the actuator 132 is not designed to extract the lockbolt 120 from a wedged condition, the power rating for the actuator 132 can be kept low. This lends to lower cost of the actuator 132 and associated running circuitry as well as generally smaller size and easier packaging.

One passive feature that aids in releasing the lockbolt 120 from a wedged condition is the tapered tip 152 of the lockbolt 120. When locked, two tapered surfaces 152A of the tip 152 interfere with and potentially contact the steering member ribs 128 are tapered by an angle α from the adjacent flat sides of the lockbolt 120. Because the adjacent flat sides of the lockbolt 120 are substantially parallel with the lockbolt axis B, the same angle α is made between the tapered surfaces 152A and the lockbolt axis B. From the wedged condition, rotation of the steering member 104 causes the side of one of the ribs 128 to contact one of the tapered surfaces 152A of the tip 152. Thus, torque from the steering member 104 generates a camming reaction along axis B that urges the release of the lockbolt 120 from the wedged condition with the steering member 104. In some constructions, the angle α is between about 10 degrees and about 20 degrees. When the angle α is made too high, torque from the steering member 104 is transmitted to a large degree along the axis B of the lockbolt 120. These large forces must be borne by the actuation device 116 to keep the lockbolt 120 in the locked position. Thus, the structural demands on the shuttle 136, the output shaft 140, etc. are higher. On the other hand, when the angle α is made too small, a very large torque from the steering member 104 is required to produce a camming force (along axis B) sufficient to release the lockbolt 120 from the wedged condition. In certain constructions, such as the illustrated construction, an angle α between about 12 degrees and about 16 degrees may provide an advantageous balance of these design considerations.

Another passive feature that aids in releasing the lockbolt 120 from a wedged condition is the spring 188, which is compressed from its at-rest state when the lockbolt 120 is in the locked position. Therefore, the spring 188 stores energy that urges the lockbolt 120 to the unlocked position whenever the lockbolt 120 is in the locked condition, including when in a wedged condition.

As mentioned above, the operation of the actuator 132 is not affected whatsoever by the existence of a wedged condition. The actuator 132 operates to draw the shuttle 136 and thus the cam roller 144 out of the blocking position of FIG. 5 and toward the non-blocking position of FIG. 6. However, movement of the shuttle 136 does not directly cause movement of the lockbolt 120 to the unlocked position. Once the shuttle 136 and the cam roller 144 are moved out of the way, the tapered tip 152 and the spring 188 work together to drive the lockbolt 120 from the wedged condition without active pulling or powered extraction via the actuator 132 or any other powered device acting on the lockbolt 120.

FIGS. 9-12 illustrate a steering lock 300 according to yet another construction. The steering lock 300 of FIGS. 9-12 is similar in many aspects to the steering lock 100 of FIGS. 1-7. Reference characters, with leading digits incremented by 100, are re-used where appropriate for consistency. Reference is made to the above description of the steering lock 100 for features and aspects of the steering lock 300 of FIGS. 9-12 not specifically described below.

Figure 9:
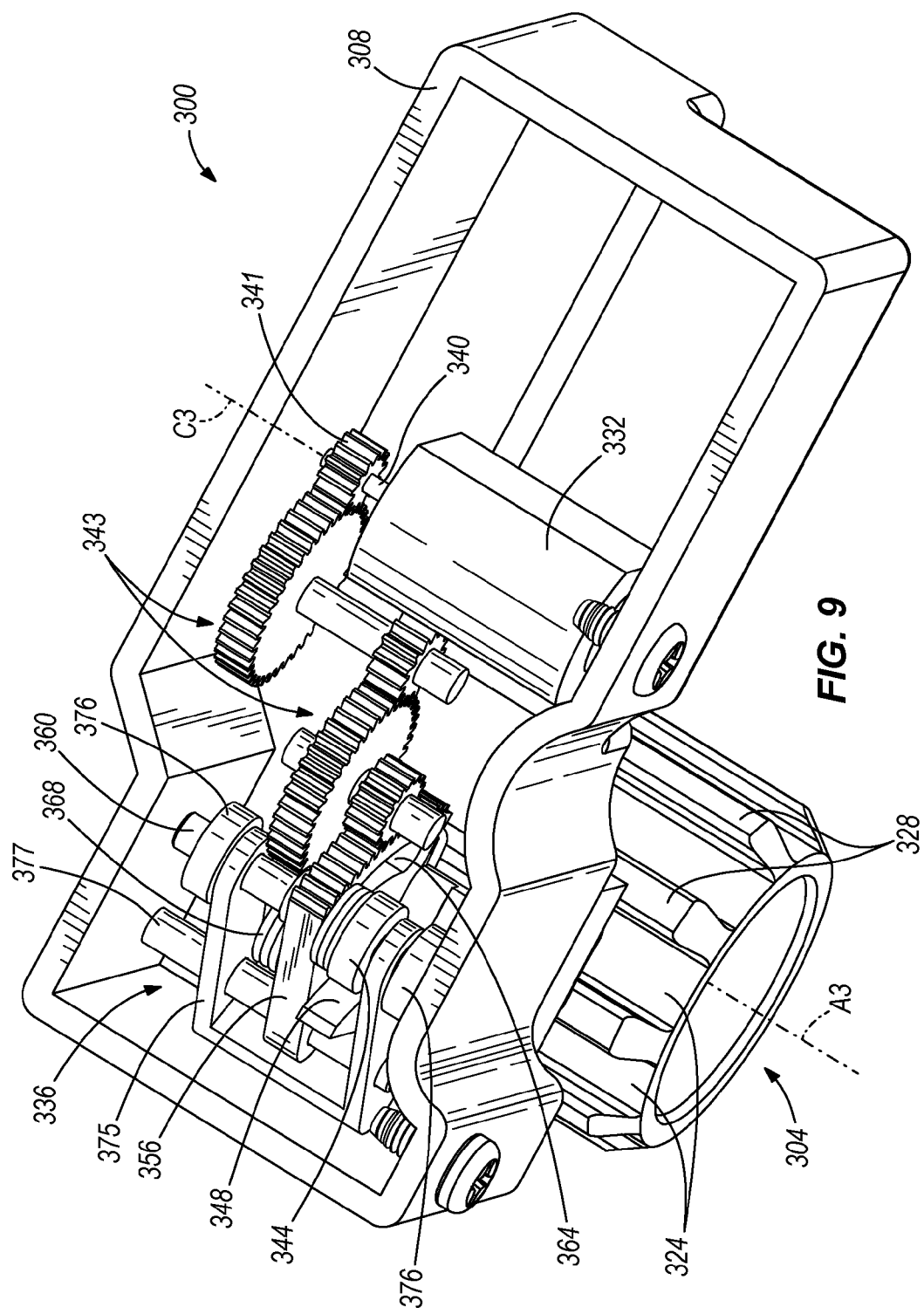
FIG. 9 is a perspective view of a steering lock according to another construction in which a rotary shuttle is provided.
Figure 10:
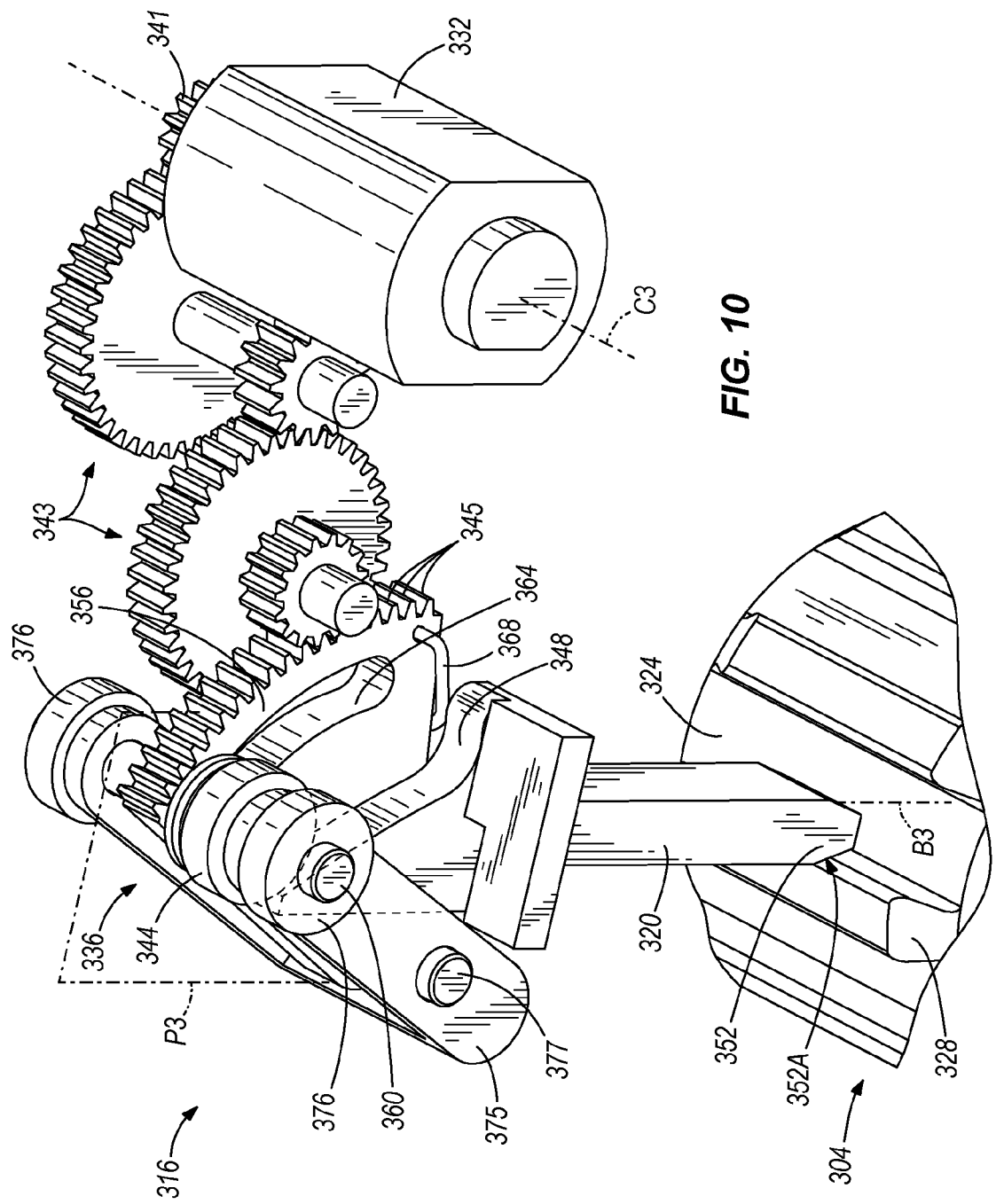
FIG. 10 is a perspective view of the steering lock of FIG. 9 in a locked state.
Figure 11:
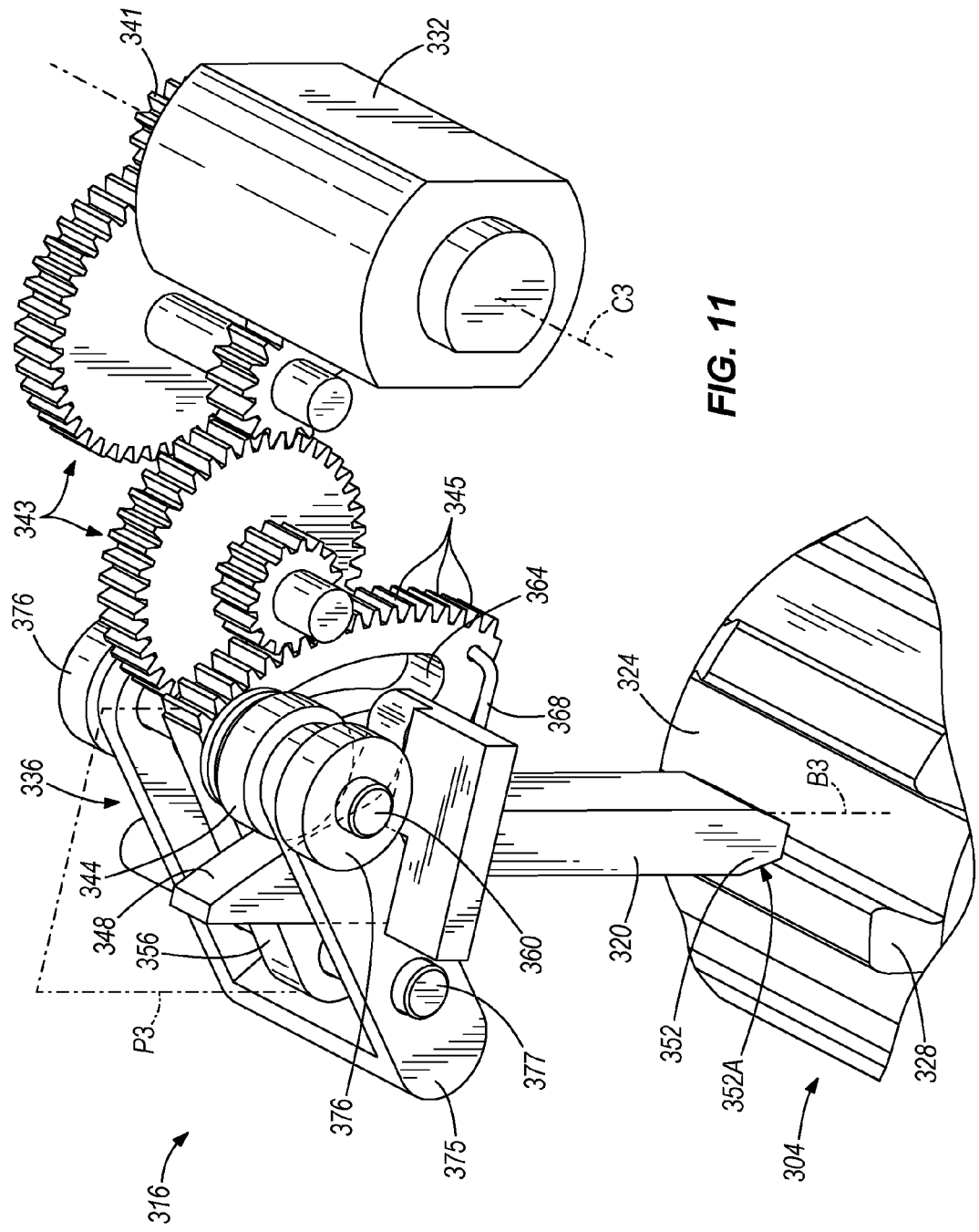
FIG. 11 is a perspective view of the steering lock of FIG. 9 in an unlocked state.
Figure 12:
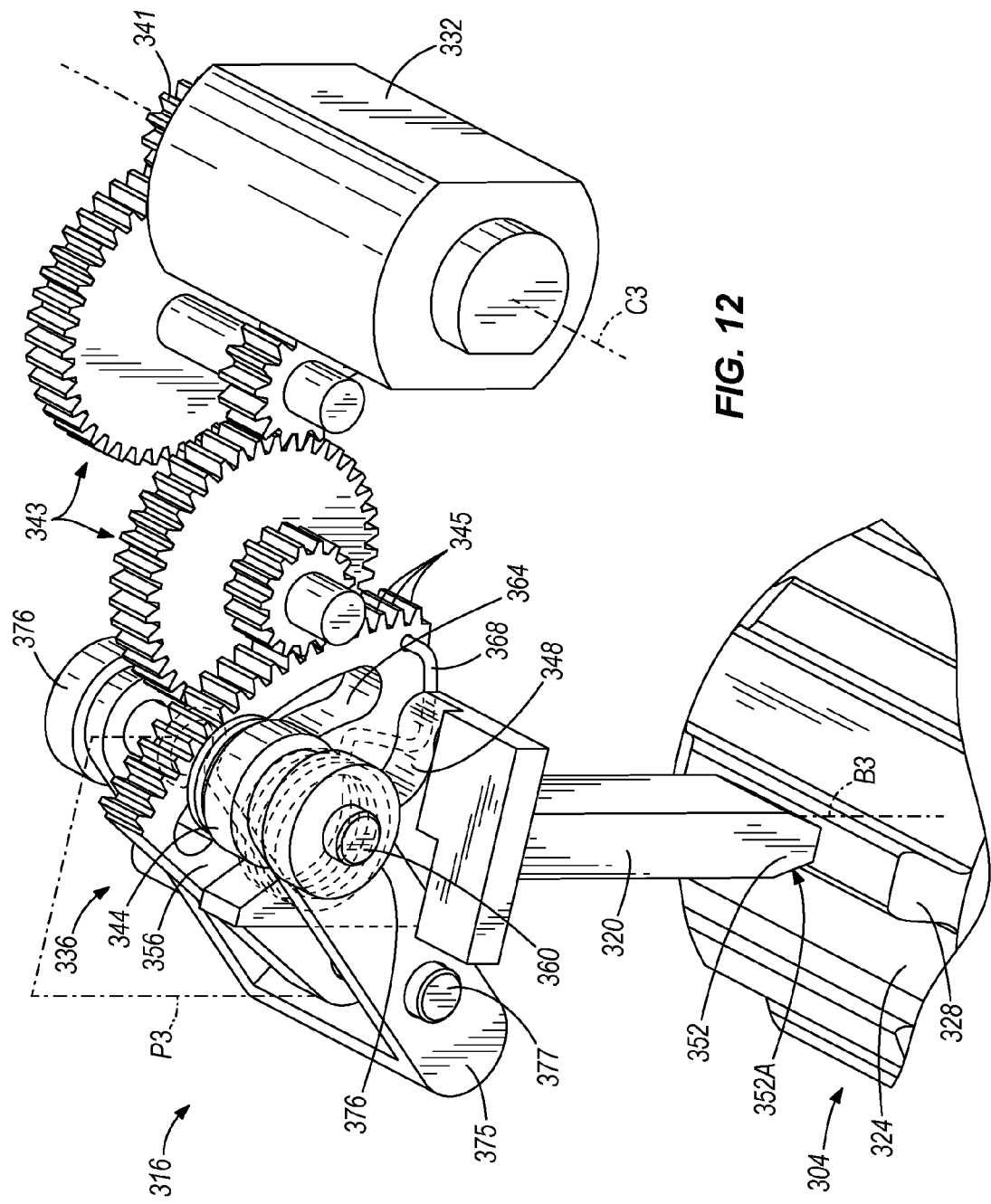
FIG. 12 is a perspective view of the steering lock of FIG. 9 in a state in which a lockbolt is obstructed from reaching the locked state when actuated.

FIG. 9 illustrates the steering lock 300 without the cover of the housing 308, and FIGS. 10-12 illustrate the steering lock 300 without the housing 308 at all so that the actuation device 316 can be seen clearly. As with the steering lock 100, the steering lock 300 of FIGS. 9-12 includes a lockbolt 320 that is movable between a steering member-locking position or simply "locked" position (FIG. 10) and a steering member-unlocking position or simply "unlocked" position (FIG. 11). In the illustrated construction, the lockbolt 320 is movable between the locked and unlocked positions along an axis B3 that is substantially perpendicular to the axis A3 of the steering member 304.

The actuator 332 of the steering lock 300 includes an output shaft 340 provided with a drive gear 341. The output shaft 340 and the drive gear 341 define an axis C3. The shuttle 336 is driven back and forth between blocking and non-blocking positions by the drive gear 341. In the illustrated construction, a plurality of intermediate gears 343 are positioned between the drive gear 341 and a set of gear teeth 345 on the guide body 356 of the shuttle 336. The intermediate gears 343 provide a reduction in angular velocity and an increase in torque from the output shaft 340.

The guide body 356 pivots within the housing and moves in a plane P3 that is perpendicular with the axis C3 of the output shaft 340 and parallel to the axis B3 of the lockbolt 320. In some construction, the guide body 356 and actuator 332 have alternate orientations. For example, the guide body 356 and actuator 332 may be configured to be turned 90 degrees so that the axis C3 of the output shaft 340 is parallel to the axis B3 of the lockbolt 320 and the guide body 356 moves in a plane that is perpendicular to the axis B3 of the lockbolt 320. The housing 308 includes at least one internal guide surface (not shown) similar to those of the housing 108 for guiding movement of the guide body 356, however the guide surface is arc-shaped to guide the pivoting movement of the guide body 356.

In addition to the guide body 356, the shuttle 336 includes a cam roller 344 and auxiliary rollers 376. The cam roller 344 is mounted on a shaft 360 that is received in an arc-shaped slot 364 in the guide body 356. The cam roller 344 contacts an arc-shaped cam follower surface 348 to selectively actuate the lockbolt 320 from the unlocked position to the locked position. Similar to the actuation device 116 described above, the actuator 332 and the shuttle 336 are only operable to actuate the lockbolt 320 to the locked position and block the lockbolt 320 from returning to the unlocked position, and are not configured to actively retract the lockbolt 320 from the locked position.

Unlike the shuttle 136 of FIGS. 1-7 in which the shaft 160 simply slides back and forth in the slot 164 to allow movement of the cam roller 144 relative to the guide body 156, the shaft 360 on which the cam roller 344 of the steering lock of FIGS. 9-12 is supported by a pivot arm 375 that is coupled to the guide body 356 with a pivot shaft 377.

Similar to the shuttle 136 described above, the shuttle 336 includes a spring 368 that biases the shaft 360 and the cam roller 344 to one end of the slot 364. In the illustrated construction, the spring 368 is a torsion spring that can function as a lost motion device when, at the time that the actuator 332 is powered to move the lockbolt 320 from the unlocked position to the locked position, the lockbolt 320 is aligned with one of the ribs 328 on the steering member 304. When this occurs, the spring 368 stores energy as the guide body 356 moves to the blocking position and the cam roller 344 remains in the non-blocking position. The slot 364 in the guide body 356 allows the guide body 356 to move relative to the shaft 360 and the cam roller 344. The lost motion device prevents an overloading of the actuator 332 when the lockbolt 320 contacts a rib 328. As soon as the steering member 304 is moved slightly to remove the obstructing rib 328 from the path of the lockbolt 320, the energy stored in the spring 368 is released so that the cam roller 344 drives the lockbolt 320 into the locked position and blocks it from retraction to the unlocked position.

Various features and advantages of the invention are set forth in the following claims.

What is claimed is:

1. A steering lock for selectively inhibiting rotation of a rotary steering member having a rib, the steering lock comprising:
    a lockbolt movable along a first axis between a steering member-locking position, in which a distal tip of the lockbolt is positioned in interference with the rib, and a steering member-unlocking position, in which the distal tip of the lockbolt is positioned out of interference with the rib;
    a shuttle movable along a path non-parallel to the first axis between a non-blocking position, in which the shuttle does not obstruct movement of the lockbolt from the steering member-locking position to the steering member-unlocking position, and a blocking position, in which the shuttle obstructs movement of the lockbolt out of the steering member-locking position;
    an actuator coupled to the shuttle and operable to drive the lockbolt to the steering member-locking position by moving the shuttle from the non-blocking position to the blocking position; and
    a lost motion connection between the actuator and the lockbolt,
    wherein motive force from the actuator is transmitted through the lost motion connection to drive the lockbolt to the steering member-locking position when the rib is not aligned with the first axis, and wherein motive force from the actuator is taken up by the lost motion connection when the rib is aligned with the first axis.

2. The steering lock of claim 1, wherein the shuttle includes a first portion coupled to the lockbolt and a second portion coupled to the actuator, wherein the lost motion connection is provided between the first and second portions of the shuttle.

3. The steering lock of claim 2, wherein the lost motion device includes a spring.

4. The steering lock of claim 2, wherein the first portion includes a roller unit configured to provide a rolling interface for driving the lockbolt to the steering member-locking position.

5. The steering lock of claim 4, further comprising a housing having a substantially flat guide surface for supporting the roller unit.

6. The steering lock of claim 1, wherein a first inclined cam surface is provided between the shuttle and the lockbolt so that substantially linear movement of the shuttle to the blocking position in a direction substantially perpendicular to the first axis is configured to move the lockbolt to the steering member-locking position.

7. The steering lock of claim 6, wherein a second inclined cam surface is provided between the shuttle and the lockbolt so that substantially linear movement of the shuttle to the non-blocking position in a direction substantially perpendicular to the first axis is configured to move the lockbolt to the steering member-unlocking position.

8. The steering lock of claim 1, wherein the lockbolt includes a tapered tip.

9. The steering lock of claim 8, wherein a surface of the tapered tip makes an angle between about 10 degrees and about 20 degrees with the first axis.

10. The steering lock of claim 9, wherein the surface of the tapered tip makes an angle between about 12 degrees and about 16 degrees with the first axis.

11. The steering lock of claim 1, wherein the lockbolt is biased to the steering member-unlocking position.

12. A steering lock for selectively inhibiting rotation of a rotary steering member having a rib, the steering lock comprising:
   a lockbolt movable along a first axis between a steering member-locking position, in which a distal tip of the lockbolt is positioned in interference with the rib, and a steering member-unlocking position, in which the distal tip of the lockbolt is positioned out of interference with the rib;
   a shuttle movable along a path non-parallel to the first axis between a non-blocking position, in which the shuttle does not obstruct movement of the lockbolt from the steering member-locking position to the steering member-unlocking position, and a blocking position, in which the shuttle obstructs movement of the lockbolt out of the steering member-locking position;
   an actuator coupled to the shuttle and operable to drive the lockbolt to the steering member-locking position by moving the shuttle from the non-blocking position to the blocking position; and
   a lost motion connection between the actuator and the lockbolt, the lost motion connection being configured to store energy supplied from the actuator when the shuttle is moved from the non-blocking position to the blocking position while the rib is aligned with the first axis,
   wherein the lockbolt is movable to the steering member-locking position by the stored energy of the lost motion connection when the rib is moved away from the first axis.

13. The steering lock of claim 12, wherein the shuttle includes a first portion coupled to the lockbolt and a second portion coupled to the actuator, wherein the lost motion connection is provided between the first and second portions of the shuttle.

14. The steering lock of claim 13, wherein the lost motion device includes a spring.

15. The steering lock of claim 13, wherein the first portion includes a roller unit configured to provide a rolling interface for driving the lockbolt to the steering member-locking position.

16. The steering lock of claim 15, further comprising a housing having a substantially flat guide surface for supporting the roller unit.

17. The steering lock of claim 12, wherein a first inclined cam surface is provided between the shuttle and the lockbolt so that substantially linear movement of the shuttle to the blocking position in a direction substantially perpendicular to the first axis is configured to move the lockbolt to the steering member-locking position.

18. The steering lock of claim 17, wherein a second inclined cam surface is provided between the shuttle and the lockbolt so that substantially linear movement of the shuttle to the non-blocking position in a direction substantially perpendicular to the first axis is configured to move the lockbolt to the steering member-unlocking position.

19. The steering lock of claim 12, wherein the lockbolt includes a tapered tip.

20. The steering lock of claim 19, wherein a surface of the tapered tip makes an angle between about 10 degrees and about 20 degrees with the first axis.

21. The steering lock of claim 20, wherein the surface of the tapered tip makes an angle between about 12 degrees and about 16 degrees with the first axis.

22. The steering lock of claim 12, wherein the lockbolt is biased to the steering member-unlocking position.

* * * * *